United States Patent [19]

Pritchard

[11] 4,329,714
[45] May 11, 1982

[54] AUDIO DISTORTION ELIMINATOR
[75] Inventor: Dalton H. Pritchard, Princeton, N.J.
[73] Assignee: RCA Corporation, New York, N.Y.
[21] Appl. No.: 210,790
[22] Filed: Nov. 26, 1980
[51] Int. Cl.³ .............................................. H04N 5/60
[52] U.S. Cl. .................................. 358/198; 179/1 P;
  358/197; 455/307; 455/309; 455/312
[58] Field of Search ................ 358/198, 197; 179/1 P;
  455/303, 304, 305, 306, 307, 309, 312

[56] References Cited
U.S. PATENT DOCUMENTS

| | | | |
|---|---|---|---|
| 4,096,516 | 6/1978 | Pritchard | 358/31 |
| 4,153,815 | 5/1979 | Chaplin et al. | 179/1 P |
| 4,158,209 | 6/1979 | Levine | 358/31 |
| 4,232,381 | 11/1980 | Rennick et al. | 179/1 P X |
| 4,237,485 | 12/1980 | Saito et al. | 358/197 |

*Primary Examiner*—Robert L. Richardson

*Attorney, Agent, or Firm*—Paul J. Rasmussen; William H. Meagher; W. Brinton Yorks, Jr.

[57] ABSTRACT

An audio distortion elimination circuit is provided which eliminates the effects of periodic decreases in signal amplitude of an audio signal. A comb filter includes an undelayed signal path, a signal path including a delay line and a combining circuit coupled between a source of audio signals and an audio output circuit. The combining circuit combines the delayed and undelayed audio signals to provide a response for the comb filter which is a function of the delay of the delay line and exhibits periodically recurring points of maximum attenuation at the fundamental frequency of the periodic decreases in signal amplitude and at harmonics thereof. The comb filter may be made adaptive so that comb filtering is provided only during reception of a distorted signal.

7 Claims, 3 Drawing Figures

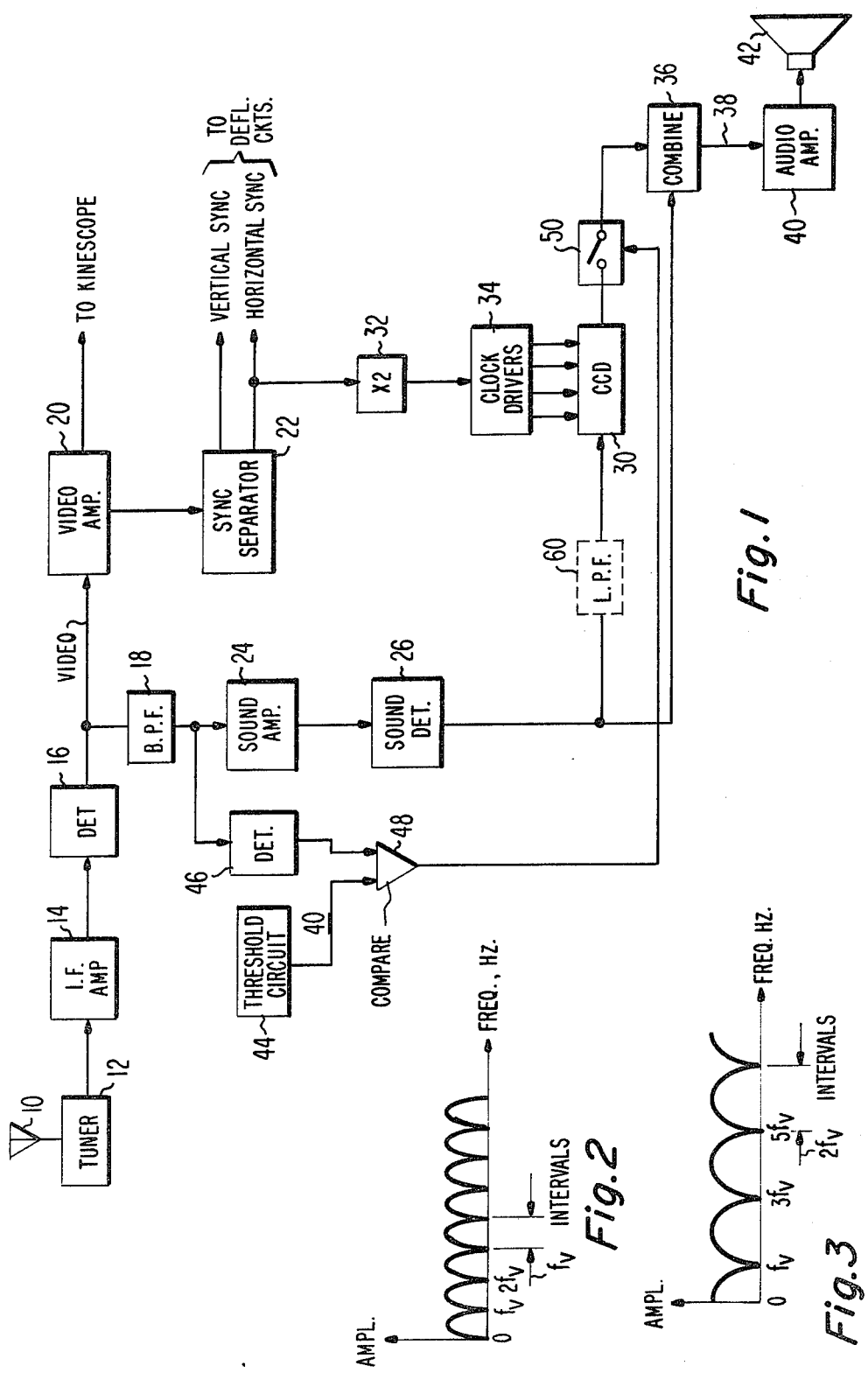

AUDIO DISTORTION ELIMINATOR

This invention relates to receivers for signaling systems in which audio information is conveyed via frequency modulation of carrier waves and, in particular, to the use therein of a comb filter circuit for removing sound buzz or hum components from the recovered audio signal.

In such signalling systems, the continuous presence of a modulated or unmodulated FM carrier is essential for the noise-free reproduction of audio information. If the carrier is interrupted for any reason at a periodic rate, harmonic components of the periodic interruption will be reproduced along with the audio information. The reproduced harmonic components can manifest themselves as a buzz-like noise in the reproduced audio sound.

The FM sound system of a television receiver is subject to such sound buzz interference. In the NTSC television system, the video carrier signal is amplitude modulated by the video information to a theoretical limit of $87\frac{1}{2}$ percent of the maximum depth of modulation, with the carrier amplitude being reduced as the percent modulation increases. The audio information is frequency modulated on a sound carrier separated from the video carrier by a given frequency separation (e.g., 4.5 MHz in the NTSC system). In actual practice, occasions occur when particular program material produces overmodulation conditions in signals broadcast by a particular station, with peak white components causing disappearances of the picture carrier or reduction of its amplitude to an insignificant level.

When such signals are received by television receivers employing a sound system of the well-known intercarrier type (where selective amplification of the beat between picture and sound carriers is effected in the receiver's sound channel to develop the input for the audio FM detector), the overmodulation occurrences depress the intercarrier sound signal below the threshold of detection in the FM detector. As a consequence, undesired components appear in the FM detector output with frequencies lying, inter alia, at the television signal's field frequency (e.g., approximately 60 Hz for the NTSC system) and at multiples thereof across the TV audio band of approximately 10-12 kHz. This disturbance is evidenced by a loud sound buzz having a fundamental at the field frequency with harmonic components spaced with field frequency separation throughout the audio spectrum, and with relative intensities determined by the severity and durations of the over-modulation periods. Such buzz components above the 10-12 kHz range may be inaudiable, or filtered out; however, components within the audio band are extremely disturbing and cannot be removed by a simple filter.

In accordance with the principles of the present invention, a delay line is coupled in the audio signal path following the FM detector and arranged to form a comb filter with a response having points of maximum attenuation located at the field frequency and multiples thereof. The delay line is coupled to receive the audio signal and produces a delayed audio signal. The delayed signal is combined with the underlayed signal to produce an output signal having a comb filter response characteristic. The comb filter may be made adaptive as a function of signal interruption, whereby the comb filter only operates under sound buzz conditions. The comb filter may be constructed to attenuate all harmonics of the field frequency in the audio signal, or only odd or even harmonics thereof. In applications where power line modulation is the primary source of sound buzz or hum, the comb filter may be arranged to attenuate only those frequency components located in the vicinity of the fundamental power line frequency and low order harmonics thereof.

In the drawings:

FIG. 1 illustrates in block diagram form a portion of a TV receiver incorporating an audio system constructed in accordance with the principles of the present invention;

FIG. 2 illustrates the amplitude versus frequency response at the output of the comb filter of FIG. 1; and FIG. 3 illustrates an alternate amplitude versus frequency response at the output of the comb filter of FIG. 1.

In FIG. 1, an antenna 10 supplies a received television signal to a tuner 12, which converts the received signal to an intermediate frequency signal. The intermediate frequency signal is applied to an I.F. amplifier 14, which amplifies the signal and supplies it to a detector 16. The detector 16 produces a baseband video signal and an intercarrier sound signal. The video signal is amplified by a video amplifier 20 and supplied by way of further processing circuitry (not shown) to a kinescope for display of the video information.

A bandpass filter 18 is coupled to the output of the detector 16 and passes only the intercarrier sound signal to an amplitude detector 46 and a sound amplifier 24. The sound amplifier 24 produces an amplified and limited signal which is applied to an FM sound detector 26. The detected audio signal is applied to the input of a CCD device 30 and a combining circuit 36. The output of the CCD device 30 is coupled by a controlled switch 50 to a second input of the combining circuit 36. The output 38 of the combining circuit 36 is coupled to the input of an audio amplifier 40, the output of which is coupled to drive a loudspeaker 42.

The output of the amplitude detector 46 is coupled to one input of a comparator 48. A threshold circuit 44 is coupled to the second input of the comparator 48, the output of which is coupled to the control input of the switch 50. The detector 46, the threshold circuit 44, and the comparator 48 together comprise an overmodulation or sound signal dropout detector 40.

The video amplifier 20 supplies an amplified video signal to a sync separator 22. The sync separator produces separated vertical and horizontal sync signals for the deflection circuitry of the television receiver (not shown). The horizontal sync signals are also applied to the input of a frequency doubler 32, the output of which is coupled to the input of clock drivers 34. Outputs of clock drivers are coupled to the clock inputs of the CCD device 30.

The operation of the configuration of FIG. 1 will first be described with switch 50 assumed to be constantly closed, neglecting the operation of the sound signal dropout detector 40. The horizontal sync signal is doubled in frequency by the doubler 32 and supplied to the clock drivers 34. The clock drivers 34 supply the necessary clock signals to the CCD device 30. In an NTSC television receiver, doubling the horizontal sync frequency provides a convenient clock signal frequency for a CCD device of an appropriate number of device elements.

The sound detector 26 supplies an undelayed audio signal to the combining circuit 36 and the CCD device 30. The CCD device delays the signal, and the delayed signal is applied to the combining circuit. In this particular example, the delayed and undelayed audio signals are subtractively combined by the combining circuit. The resultant difference signal will exhibit a combed amplitude versus frequency response as shown in FIG. 2, with the locations of the points of maximum attenuation (the "teeth" of the comb response) determined by the amount of delay imparted to the delayed signal by the CCD device 30.

In order to comb out the fundamental frequency of the field rate interruptions, and the harmonics thereof, the comb response should appear as shown in FIG. 2, with teeth of maximum attenuation located at the fundamental field frequency, $f_v$, and harmonic frequencies $2f_v$, $3f_v$, etc. Since the teeth locations are determined by the CCD delay, the following calculations are made to determine the characteristics of the CCD device 30. The CCD delay is calculated as:

$$\text{Delay (milliseconds)} = \frac{\text{Number of CCD elements}}{\text{Clock Frequency (kHz)}}$$

The delay is equal to the time period of the $f_v$ intervals shown in FIG. 2, which, in the NTSC system, is the time period of the 60 Hz field rate, or 16.66 msec. In the NTSC color TV system, the horizontal sync frequency is 15,734 Hz, which is doubled by the doubler 32 to develop the clock frequency of 31.468 kHz. The number of elements in the CCD device is then calculated as:

Number of elements=(Delay) (Clock Frequency)
Number of elements=(16.66 msec.) (31.464 Khz)
Number of elements=524.26

Therefore, a CCD device with 524 elements is used in the arrangement of FIG. 1 to produce the combed response of FIG. 2 in an NTSC receiver. If desired, a lowpass filter may be connected at the output of the CCD device to remove harmonic frequency components of the clock signal from the delayed signal and to provide a slight amount of additional delay corresponding to the fractional portion of the number of elements calculated above. Alternatively, the delayed and undelayed signals may be combined in the CCD device itself, in a manner which accurately provides the necessary delay difference, through the use of long and short (equalizing) CCD delay lines, as described in U.S. Pat. No. 4,217,605. This latter system has been constructed and tested and found to satisfactorily remove the objectionable field rate related sound buzz components. The 16.66 msec. delay of the comb filter was found to produce a very slight echo effect in the reproduced audio signal, but this effect was not objectionable. The intelligibility of the reproduced audio was found to be excellent.

It may be desirable to make the comb filter adaptive so that it is activated only during periods of overmodulation when sound buzz is likely to occur. This may be done by the use of the overmodulation detector 40 and the switch 50. The amplitude detector 46 senses a decrease in the sound carrier amplitude caused by overmodulation. The detected envelope of the sound carrier is compared with a threshold level supplied by the threshold circuit 44 in the comparator 48. When the sound carrier amplitude goes below the minimum level at which the sound detector 26 will operate satisfactorily, the output signal from the comparator 48 closes the normally open switch 50. When the switch 50 is open, only the usual undelayed audio signal is coupled to the audio amplifier by the combining circuit 36. With the switch 50 closed, the delayed audio signal at the output of the CCD device 30 is applied to the combining circuit 36 to produce a difference signal with a response characteristic as shown in FIG. 2. The components of $f_v$ which cause sound buzz are thereby eliminated from the audio signal.

Other modifications of the arrangement of FIG. 1 are possible. For instance, the receiver may incorporate means for removing even harmonic interference prior to application of the intercarrier sound signal to the sound detector. Accordingly, the characteristic of the comb filter may be modified to cancel only the remaining odd harmonic signal components. Such a characteristic is shown in FIG. 3, in which the comb filter response is seen to have points of maximum attenuation at the fundamental frequency of $f_v$, and at odd harmonic frequencies of $3f_v$, $5f_v$, etc. If the clock frequency for the CCD device remains fixed at 31,468 Hz as before for the NTSC television system, the comb characteristic of FIG. 3 may be produced by halving the number of elements of the CCD device. A CCD device having 262 elements clocked at a 31,468 Hz rate will produce the response characteristic of FIG. 3 at the output 38 of the combining circuit in an NTSC receiver if the combining circuit additively combines the delayed and undelayed signals. Summing of the two signals is necessary to locate the points of maximum attenuation at the fundamental and odd harmonic frequencies. It may be seen that the response characteristic of FIG. 2 has a first point of maximum attenuation at D.C. (zero Hz), whereas the response curve of FIG. 3 exhibits a point of minimum attenuation at D.C. and drops to a point of maximum attenuation at $f_v$. This difference is provided by combining the delayed and undelayed signals additively instead of subtractively with a different number of CCD device elements. The response characteristic of FIG. 3 will also impart a reduced echo effect to the reproduced audio signal, as compared with the response characteristic of FIG. 2.

In nontelevision sound systems, field frequency components may not be a source of sound buzz. Instead, the primary source of sound buzz or hum, may be frequency components of a 50 Hz or 60 Hz power line. Power line interference will generally develop only a few significant harmonic components above the fundamental frequency, so that it is not necessary to comb the audio signal over the full audio band, but only in the vicinity of the power line fundamental frequency. A response characteristic of this form may be provided by clocking the 524 element CCD device at about 31.464 kHz and inserting a lowpass filter in the delayed signal path, as shown by dashed box 60 in FIG. 1. Above the break frequency of the lowpass filter, the depth of the teeth of the comb will be progressively less, as the lowpass filter rolls off the delayed signal. Full combining of the audio signal at the output 38 will therefore occur only below the cutoff frequency of the lowpass filter, with higher frequencies of the output signal being virtually unaffected by the comb filter.

What is claimed is:
1. An audio distortion elimination circuit comprising:
   a source of carrier waves frequency modulated by audio information and subject to undesired decreases in the amplitude of said waves;

an FM detector coupled to receive said carrier waves and having an output at which is produced an audio signal which may contain sound buzz components resulting from said undesired amplitude decreases;

a comb filter, including a relatively undelayed signal path and a relatively delayed signal path coupled in parallel between the output of said FM detector and means for combining the delayed and undelayed signals conducted by said paths, said combining means having an output at which comb filtered audio signals are produced, said delayed signal path including a delay line, and said delay line exhibiting a delay which provides said comb filter with a response exhibiting points of maximum attenuation at a frequency of recurrence of said undesired amplitude decreases and at harmonics thereof; and means, coupled to the output of said combining means, for reproducing said audio signals.

2. An audio distortion elimination circuit comprising:

a source of audio signals which are subject to amplitude modulation interference which is related to the frequency of an alternating current power source;

a comb filter including means having first and second inputs and an output for combining a relatively delayed and a relatively undelayed audio signal;

a first signal path coupled between said source of audio signals and said first input of said combining means for supplying relatively undelayed audio signals to said first input;

a second signal path including a delay line coupled between said source of audio signals and said second input of said combining means for supplying relatively delayed audio signals to said second input;

wherein the delay of said delay line is chosen to produce a comb filter response at the output of said combining means exhibiting periodically recurring nulls at the fundamental and harmonic frequencies of said alternating current power source frequency; and means, coupled to the output of said combining means for reproducing said audio signals.

3. The audio distortion elimination circuit of claim 1 or 2, wherein said delay line comprises a charge-coupled device delay line of a given number of serially-coupled elements clocked by a clock signal, and wherein the delay of said delay line is determined by the number of elements of said charge-coupled device delay line and the frequency of said clock signal.

4. The audio distortion elimination circuit of claim 2, wherein said second signal path further includes a low-pass filter.

5. The arrangement of claim 1, further comprising:

means serially coupled in said delayed signal path, and having a control input, for selectively attenuating the signal in said delayed signal path; and a dropout detector having an input connected to said source of carrier waves and an output coupled to the control input of said attenuating means, and responsive to said interference for selectively attenuating the delayed signal applied to said combining means when said undesired amplitude decreases are not present.

6. The arrangement of claim 5, wherein said dropout detector includes an amplitude detector having an input coupled to receive said carrier waves and an output, and a comparator having a first input coupled to the output of said amplitude detector, a second input coupled to receive a threshold voltage, and an output coupled to the control input of said attenuating means for producing a control signal whenever said threshold voltage exceeds the detected amplitude level at said first input.

7. In a television receiver, apparatus for reducing sound buzz comprising:

a source of television signals including horizontal sync signal components recurring at a given frequency, and an FM sound carrier signal which is subject to amplitude modulation interference at frequencies harmonically related to the field frequency of said television signals;

an FM detector coupled to receive said FM sound carrier signal for producing an audio signal;

a comb filter including means having first and second inputs and an output for combining a relatively delayed and a relatively undelayed audio signal;

a first signal path coupled between said FM detector and said first input of said combining means for supplying relatively undelayed audio signals to said first input;

a second signal path including a charge-coupled device delay line of a given number of serially-coupled elements coupled between said FM detector and said second input of said combining means for supplying relatively delayed audio signals to said second input; and clocking means coupled to said charge-coupled device delay line for transferring said audio signals through said serially-coupled elements at a given rate which is harmonically related to said sync signal frequency, wherein the number of said elements and the rate of said clocking means are chosen to produce a comb filter response at the output of said combining means exhibiting periodic nulls at the fundamental and harmonic frequencies of said field frequency; and means coupled to the output of said combining means for reproducing said audio signals.

* * * * *